UNITED STATES PATENT OFFICE.

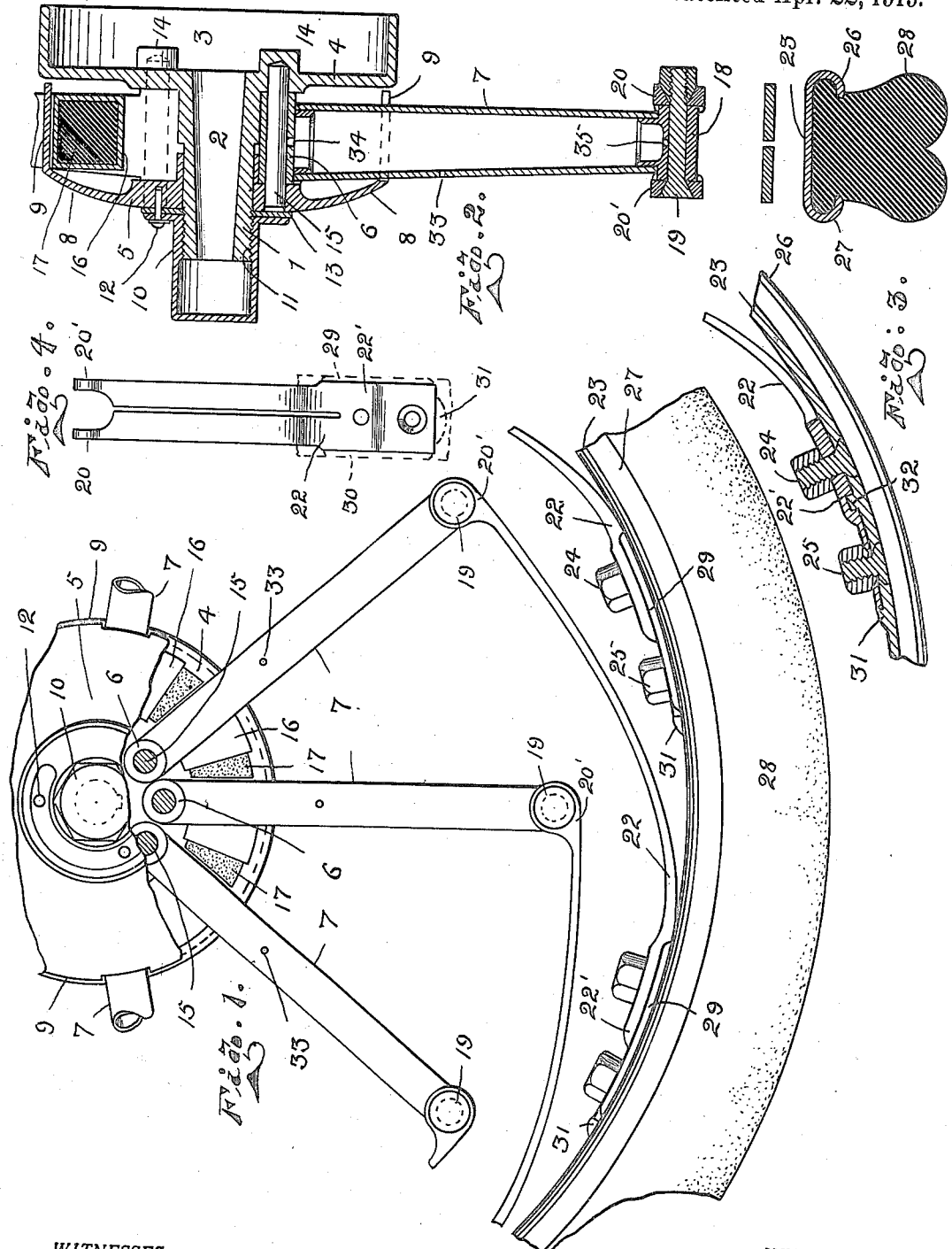

ARTTURI JUTILA, OF DULUTH, MINNESOTA.

RESILIENT WHEEL.

1,301,570.　　　　　Specification of Letters Patent.　　Patented Apr. 22, 1919.

Application filed September 4, 1915, Serial No. 48,969.　Renewed November 11, 1918.　Serial No. 262,070.

*To all whom it may concern:*

Be it known that I, ARTTURI JUTILA, a citizen of Finland, residing at Duluth, in the county of St. Louis and State of Minnesota, have invented certain new and useful Improvements in Resilient Wheels, of which the following is a specification, reference being had therein to the accompanying drawing.

This invention consists of certain improvements in resilient or spring wheels, such as for use upon automobiles and the like.

The object is to produce such a wheel, of practical, durable and cheap construction.

Another object is to produce means within the wheel whereby the torsional stress thereupon is automatically evenly distributed throughout the resilient members thereof.

Referring to the accompanying drawings forming part of this application and in which like reference characters indicate like parts:

Figure 1 is a side elevation of a fragmental portion of a wheel embodying my invention.

Fig. 2 is a vertical cross sectional view through the center of one of the spokes of the wheel.

Fig. 3 is a diametrical sectional view through the center of the spoke spring attachment with the felly, and Fig. 4 is a plan view of one of the spring spokes.

1 represents the hub of the wheel, which has a tapered bore 2 as is common in automobile wheels, and may or may not have formed integral therewith the band brake rim 3 upon the extremity of the flange 4, thereof.

Upon the hub 1 is designed to snugly fit the intermediate cap 5 which when in its place upon the hub is spaced a distance from the inner face of the flange 4 of the hub, just equal to the length of the hub 6, formed upon the inner end of each spoke 7, and which holds the hub spokes in place longitudinally.

The annular reduced flange 8 of the cap 5 has formed at substantially right angles thereto, rectangular shaped members 9, extending inwardly intermediate each pair of spokes, to act as a partial cover between said spokes, but do not form an obstruction to the free movement of the spokes, as will be described later.

The intermediate cap 5 is held in place upon the hub 1, by the outer cap 10 which is screw threaded upon the hub as at 11 and held in place against unscrewing by the spring pin 12, and threaded washer 13, the latter having a series of holes therethrough and the outer face of the intermediate cap 5 having a similar series of holes, so that the spring pin may be fitted into any such holes that coincide.

Upon the outer wall of the flange 4 of the hub 1 is formed a plurality of projecting portions 14 which are bored out from the inner side of the flange 4 to form a bearing for the journal pin 15 upon one of which each spoke is pivoted, the opposite end of each pin 15 is supported in a suitable hole formed through the hub portion of the intermediate cap 5, thus, when the spoke is in place, the intermediate cap applied and the journal pin inserted, the spoke will become pivotally mounted upon the hub intermediate the flange 4, thereof, and the intermediate cap.

The spokes 7 may be of any desired form in cross section, either square, round or oval, and each has fixed thereto adjacent the hub, 6, thereof, a rectangular shaped opened faced receptacle or housing 16 facing the next adjacent spoke.

Within each of these receptacles is snugly fitted a piece of hard rubber 17, and which normally remains spaced apart somewhat from engagement with the adjacent spoke, but is designed to engage said spoke in the event of abnormal torsional stress coming upon the hub.

The spokes 7 do not extend direct to the felly but terminate some distance short thereof in a transversely disposed hub 18, similar to the hub 6 upon the opposite end thereof.

This hub is pivotally journaled upon the pin 19, intermediate the bifurcated ends 20 and 20′ of the auxiliary spring spoke 22, the opposite united end 22′ of which is rigidly fixed to the inner wall of the felly 23, by the bolts 24 and 25, and that at an angle of approximately 75 degrees to the center line of the spoke 7.

The spokes 7 are made hollow and each has a suitable oil hole 33 formed therein for the admission of oil. A similar oil hole 34 is formed in the hub 6 and communicates with the interior of the spoke, and a hole 35 in the hub 18 also communicates with the interior of the spoke, thus forming means whereby oil may be inserted within the spoke and automatically communicated to the two journal bearings of the spoke.

Thus we have a spoke composed of a rigid member, and a flexible member, the former being pivotally attached to the hub and having means for engagement with the adjacent spokes, and the latter pivotally attached to the former and rigidly attached to the felly.

The felly is composed of a single continuous rim having two annular inwardly turned flanges 26 and 27 which securely hold the hard rubber or other similar tire 28.

Upon the inner face of the felly and spaced the proper distance apart for the reception of the ends 22' of the auxiliary spring spokes are formed suitable beds or seats comprising the side walls 29 and 30 and the end abutment wall 31 which extend inwardly from the felly and designed to surround the end 22' of the spoke when placed therein.

An upstanding rib 32 is formed transverse each of the beds thus provided and a corresponding recess is formed in the end 22' of each spring spoke, which fits down snugly onto the rib when the end of the spoke is in place, as clearly seen in Fig. 3 of the drawings, which is for the purpose of securely holding the spoke against end movement thereof.

From the foregoing it is evident that I have produced a resilient wheel wherein the torsional stress thereupon, when increased beyond a predetermined stage and which might be termed abnormal, becomes automatically distributed throughout the spoke members of the wheel by their engaging each other, said predetermined stage being fixed by the space intermediate the resilient members 17 and the adjacent spoke.

Having thus described my invention, what I claim as new and desire to secure by Letters Patent, is:

1. A resilient wheel of the character described, comprising a hub, a felly having a plurality of walled seats about the inner face thereof, and spoke engaging ribs transverse each seat, rigid spokes pivotally attached to the hub, each spoke carrying adjacent the hub a resilient spoke engaging member normally held from engagement with the adjacent spoke and flat bifurcated spring spokes pivotally attached at their bifurcated ends to the rigid spokes and rigidly attached at their opposite ends within the seats upon the felly of the wheel.

2. A resilient wheel of the character described, comprising a hub, rigid spokes pivotally connected to the hub, spring spokes pivotally connected to the rigid spokes and rigidly fixed to the felly of the wheel, and resilient means carried by each spoke adjacent the hub for engagement with the adjacent spoke but normally held from engagement therewith, as and for the purpose described.

3. In a resilient wheel of the character described, having rigid pivotal spokes, the combination with the spokes of a housing carried adjacent the hub end of each spoke and upon one side thereof carrying a resilient spoke engaging member normally held from engagement with the adjacent spoke, as and for the purpose described.

4. In a wheel construction, a hub, spokes pivoted to the hub, means yieldably limiting the swinging of the spokes with respect to the hub, leaf springs pivotally connected at one end to the free ends of the spokes, a felly, and tongue and groove connection between the free ends of the springs and felly.

5. In wheel construction, a hub, spokes pivotally connected to the hub, means for limiting the swinging movement of the spokes, a felly formed interiorly with a circumferential flange thickened at intervals to provide seats, and springs pivotally connected at one end to the free ends of the spokes and lockingly engaging at their other ends in the seats of the felly.

In testimony whereof I hereunto affix my signature in the presence of two witnesses.

ARTTURI JUTILA.

Witnesses:
W. H. DENHAM,
S. GEO. STEVENS,